(12) United States Patent
Kinpara et al.

(10) Patent No.: US 8,270,776 B2
(45) Date of Patent: Sep. 18, 2012

(54) OPTICAL WAVEGUIDE DEVICE

(75) Inventors: Yuhki Kinpara, Chiyoda-ku (JP); Satoshi Oikawa, Chiyoda-ku (JP); Toru Sugamata, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 304 days.

(21) Appl. No.: 12/586,675

(22) Filed: Sep. 25, 2009

(65) Prior Publication Data

US 2010/0086252 A1    Apr. 8, 2010

(30) Foreign Application Priority Data

Sep. 30, 2008    (JP) ................................. 2008-255088

(51) Int. Cl.
 *G02F 1/035* (2006.01)
(52) U.S. Cl. .......................................... 385/2; 264/1.24
(58) Field of Classification Search ................. 385/2, 8
 See application file for complete search history.

(56) References Cited

U.S. PATENT DOCUMENTS

| 5,138,480 | A | * | 8/1992 | Dolfi et al. .................... 359/251 |
| 5,404,412 | A | | 4/1995 | Seino et al. |
| 7,035,485 | B2 | | 4/2006 | Kondo et al. |
| 8,031,983 | B2 | * | 10/2011 | Sugamata et al. ................ 385/2 |

FOREIGN PATENT DOCUMENTS

| JP | 1-018121 A | | 1/1989 |
| JP | 05173100 A | * | 7/1993 |
| JP | 3001027 B2 | | 1/2000 |
| JP | 2003-215519 A | | 7/2003 |

* cited by examiner

*Primary Examiner* — Sarah Hahm
(74) *Attorney, Agent, or Firm* — Chapman and Cutler LLP

(57) ABSTRACT

An optical waveguide device includes: a substrate having an electro-optical effect; an optical waveguide formed on the substrate; and a control electrode for applying an electric field to the optical waveguide. The optical waveguide device has the following characteristics. A thickness of the substrate is 30 µm or less. The control electrode has a signal electrode and a ground electrode. A low-permittivity layer is formed at least on a surface portion of the signal electrode in contact with the substrate.

4 Claims, 1 Drawing Sheet

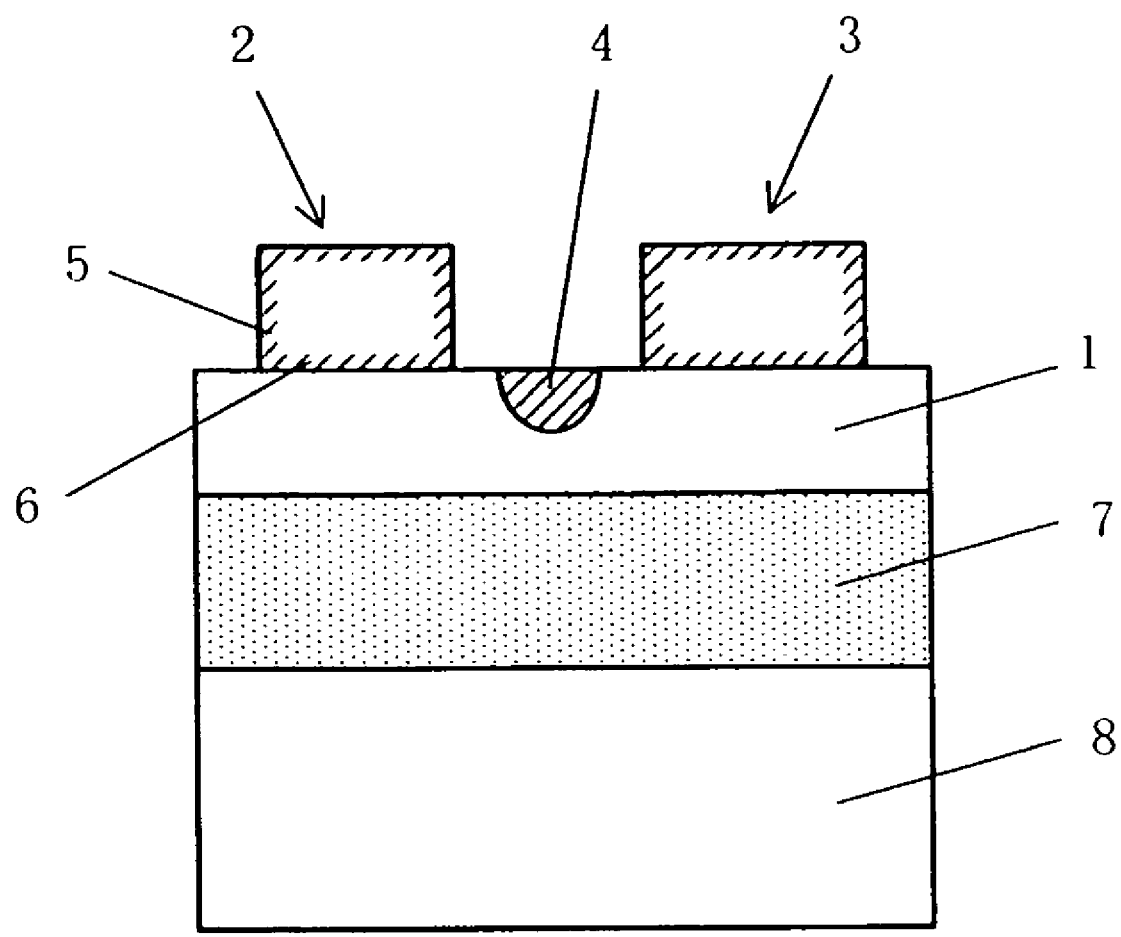

OPTICAL WAVEGUIDE DEVICE

BACKGROUND OF THE INVENTION

1. Field of the Invention

The present invention relates to an optical waveguide device, and more particularly to an optical waveguide device used in an optical communication apparatus or an optical measurement apparatus.

2. Description of Related Art

Generally, optical waveguide devices have come into widespread use in the optical communication field and the optical measurement field. The optical waveguide devices include waveguide type optical modulators in which an optical waveguide and a control electrode are formed on a substrate having an electro-optical effect.

In order to realize a widening of the bandwidth regarding optical modulation frequency, it is important to achieve velocity matching between optical waves and microwaves which are modulated signals and, as such, various methods have been hitherto proposed. For example, the various methods include increasing the thickness of the buffer layer, increasing the aspect ratio of the electrodes, a ridge structure, and the like. Furthermore, Japanese Unexamined Patent Application Publications Nos. S64-18121 and 2003-215519 disclose the following method: The optical waveguide and the control electrode are embedded in an extremely thin substrate having a thickness of 30 μm or less. The thin substrate is bonded to another substrate (a reinforcing plate) having a permittivity lower than that of the substrate. Thus, the effective refractive index of the microwaves decreases and the velocity matching between the microwaves and the optical waves is performed.

As described above, by using the thinned substrate, the degree of freedom in the design of the optical modulator is dramatically increased. For example, even without the use of a buffer layer, it is possible to produce a wideband and low-driving-voltage optical modulator. For example, when the optical waveguide is formed in the optical waveguide device, a metal such as Ti is thermally diffused into the substrate at a high temperature, thereby increasing the refractive index of the diffused portion to be higher than other portions and containing light. Then, the substrate is thinned by the polishing and the optical waveguide device is formed.

However, as disclosed in Japanese Unexamined Patent Application Publication No. 2003-215519, by using a planarized reinforcing plate or an adhesive layer having a thickness of 200 μm or less, the long-term temperature drift and DC drift are improved. However, since the electrodes are directly formed on the substrate, when a voltage is applied to the electrode, an electric field is concentrated on the corner portions of the electrode. In response to this, an electrical charge is locally concentrated on a portion in the substrate which is a dielectric substance. Moreover, a phenomenon occurs in which the driving voltage instantaneously surges (the instantaneous DC drift). The stress caused by the surge may damage the thinned substrate, creating a significant problem.

In order to cope with this problem, as disclosed in Japanese Patent No. 3001027, it is possible to form the buffer layer (0.25 μm to 2.5 μm thickness) including oxide of indium and silicon oxide between the electrode and substrate. However, the process for forming the buffer layer is an additional requirement and the buffer layer has a thickness of 0.25 μm or more. Thus, this causes an increase in the driving voltage.

SUMMARY OF THE INVENTION

An advantage of some aspects of the invention is to provide an optical waveguide device capable of preventing a thinned substrate from being damaged and reducing surge phenomenon caused by instantaneous DC drift without using a buffer layer.

According to an aspect of the invention, an optical waveguide device includes: a substrate having an electro-optical effect; an optical waveguide formed on the substrate; and a control electrode for applying an electric field to the optical waveguide. The optical waveguide device has the following characteristics. The thickness of the substrate is 30 μm or less. The control electrode has a signal electrode and a ground electrode. A low-permittivity layer (an oxide layer) is formed at least on a surface portion of the signal electrode in contact with the substrate.

It is preferable that the thickness of the low-permittivity layer be not less than 10 angstroms and not more than 1000 angstroms.

In the optical waveguide device according to the aspect of the invention, it is preferable that the low-permittivity layer be formed by an annealing process.

In the optical waveguide device according to the aspect of the invention, it is preferable that the annealing process be performed on the optical waveguide device, in which the optical waveguide and the control electrode are formed, at a temperature not less than 80° C. and not more than 250° C.

According to a further aspect of the invention, a fabrication method of an optical waveguide device includes: forming an optical waveguide and a control electrode for applying an electric field to the optical waveguide on a substrate having an electro-optical effect; setting a thickness of the substrate to 30 μm or less; performing an annealing process at a temperature not less than 80° C. and not more than 250° C.; and forming a low-permittivity layer (the oxide layer) on a surface portion of the control electrode in contact with the substrate.

In accordance with the aspect of the invention, the optical waveguide device includes: the substrate having the electro-optical effect; the optical waveguide formed on the substrate; and the control electrode for applying the electric field to the optical waveguide. In addition, the optical waveguide device has the following characteristics. The thickness of the substrate is 30 μm or less. The control electrode has a signal electrode and a ground electrode. The low-permittivity layer is formed at least on the surface portion of the signal electrode in contact with the substrate. With such a configuration, it is possible to reduce the surge phenomenon caused by the instantaneous DC drift and prevent the thinned substrate from being damaged.

Further, since the thickness of the low-permittivity layer is set to be not less than 10 angstroms and not more than 1000 angstroms, it is possible to suppress an increase in driving voltage unlike the existing buffer layer.

In accordance with the aspect of the invention, since the low-permittivity layer is formed by the annealing process, it is possible to reduce the surge phenomenon by using a simple method without increasing the complexity of the fabrication process of the optical waveguide device.

In accordance with the aspect of the invention, the annealing process is performed on the optical waveguide device, in which the optical waveguide and the control electrode are formed, at a temperature not less than 80° C. and not more than 250° C. Hence, it is possible to form a low-permittivity layer capable of effectively reducing the surge phenomenon on the surface portion of the control electrode in contact with the substrate.

In accordance with the aspect of the invention, the fabrication method of the optical waveguide device includes: forming the optical waveguide and the control electrode for applying the electric field to the optical waveguide on the substrate having the electro-optical effect; setting the thickness of the substrate to 30 μm or less; performing the annealing process at a temperature not less than 80° C. and not more than 250° C.; and forming the low-permittivity layer on the surface portion of the control electrode in contact with the substrate. With such a configuration, it is possible to fabricate the optical waveguide device capable of achieving the reduction in the surge phenomenon by using a simple method without increasing the complexity of the fabrication process of the optical waveguide device.

BRIEF DESCRIPTION OF THE DRAWINGS

FIG. 1 is a schematic sectional view illustrating an example of an optical waveguide device according to an embodiment of the invention.

DETAILED DESCRIPTION OF THE INVENTION

Hereinafter, an optical waveguide device according to an embodiment of the invention will be described in detail.

The optical waveguide device according to the embodiment of the invention includes, as shown in FIG. 1, a substrate 1 having an electro-optical effect, an optical waveguide 4 formed on the substrate, and control electrodes 2 and 3 for applying an electric field to the optical waveguide. The optical waveguide device has the following characteristics: the thickness of the substrate is 30 μm or less; the control electrodes have a signal electrode 2 and a ground electrode 3; and low-permittivity layers (oxide layers) 5 and 6 are formed at least on a surface portion of the signal electrode contacting with the substrate. By using the low-permittivity layers 5 and 6, it is possible to reduce the surge phenomenon caused by the instantaneous DC drift and prevent the thinned substrate from being damaged.

Usable materials having the electro-optical effect include, for example, lithium niobate, lithium tantalate, PLZT (lead lanthanum zirconate titanate), silica based materials, and combinations of these. In particular, crystal of lithium niobate (LN) having a high electro-optical effect is very suitable for use.

Methods of forming the optical waveguide 4 include a thermal diffusion method and a proton-exchange method. The optical waveguide 4 can be formed by diffusing Ti and the like onto the substrate surface using these methods. Further, as disclosed in Japanese Unexamined Patent Application Publication No. H06-289341, the optical waveguide may be formed in such a way that a ridge is formed on the surface of the thinned substrate 1 along the shape of the optical waveguide.

The control electrodes such as the signal electrode 2 and the ground electrode 3 can be formed using a method of patterning electrodes made of Ti.Au and a gold plating method. All the materials having the electro-optical effect are oxides. Oxygen of the materials is combined with the electrode materials, and the low-permittivity layers (the oxide layers) are formed. Since gold (Au) is in essence a material that does not oxidize easily, the electrode materials preferably include materials such as Ti.

A method of thinning the substrate 1 constituting the optical waveguide device is as follows: the above-mentioned optical waveguide is formed on the substrate having a thickness of several hundred μm, and the rear surface of the substrate is polished, thereby forming a thin film having a thickness of 30 μm or less. Subsequently, a modulation electrode is formed on the surface of the thin film. In addition, after the optical waveguide and the modulation electrode are formed, the rear surface of the substrate may be polished. Further, there is a risk that the thin film will be damaged by thermal shock at the time of forming the optical waveguide or mechanical shock through handling of the thin film during the various processes. Hence, it is preferable that the processes tending to cause thermal or mechanical shock be performed before the thin film is formed by polishing the substrate.

As shown in FIG. 1, in order to reinforce the thinned substrate 1, a reinforcing plate 8 is bonded to the substrate 1 with an adhesive layer 7 interposed therebetween.

Various materials may be used for the reinforcing plate 5. For example, as well as the same material as the thin film it may be possible to use a material having a permittivity lower than that of the thin film such as quartz, glass, or alumina or a material having a crystal orientation different from that of the thin film as described in Japanese Unexamined Patent Application Publication No. H06-289341. However, it is preferable to use a material having a linear expansion coefficient equivalent to that of the thin film in order to stabilize the modulation characteristics of an optical modulation element relative to temperature change. If it is difficult to use the equivalent material, material having a linear expansion coefficient equivalent to that of the thin film is used in an adhesive for bonding the reinforcing plate to the thin film.

In the bonding of the reinforcing plate 8 and the substrate 1, the adhesive layer 7 is used. The adhesive layer 7 can be made of various materials such as epoxy based adhesives, heat-curable adhesives, ultraviolet-curable adhesives, solder glasses, and heat-curable, photo-curable, and light-thickening resin adhesive sheets.

Next, a method of forming the low-permittivity layers (the oxide layers) on the electrode surface as a characteristic of the optical waveguide device according to the embodiment of the invention will be described.

The optical waveguide 4 and the control electrodes 2 and 3 for applying an electric field to the optical waveguide are formed on the substrate 1 having the electro-optical effect in the same manner mentioned above. In addition, the thickness of the substrate is set to 30 μm or less (in the previous step of bonding the reinforcing plate). Then, an annealing process is performed on the optical waveguide device under an oxygen atmosphere at a temperature not less than 80° C. and not more than 250° C. Due to the annealing process, the electrode surface exposed to air is formed as the low-permittivity layer 5 by oxygen in the air. The surface portion in contact with the substrate is formed as the low-permittivity layer 6 by oxygen included in the substrate.

When the temperature of performing the annealing process is less than 80° C., the low-permittivity layer is not sufficiently formed on the electrode surface. In contrast, when the temperature is more than 250° C., Li, oxygen, and the like included in the substrate 1 having the electro-optical effect are discharged into the air. This is detrimental in that the refractive index of the substrate 1 is changed.

It is preferable that the annealing process time be in the range of 10 to 180 minutes. When it is shorter than 10 minutes, the thickness of the low-permittivity layer is less than 10 angstroms. Thus, it is difficult to effectively suppress the surge phenomenon. In contrast, when it is longer than 180 minutes, the thickness of the low-permittivity layer is more than 1000 angstroms. This causes an increase in driving voltage.

According to the embodiment of the invention as described above, it is possible to provide an optical waveguide device capable of preventing a thinned substrate from being damaged and reducing a surge phenomenon caused by instantaneous DC drift without using a buffer layer.

What is claimed is:

1. An optical waveguide device comprising:
a substrate having an electro-optical effect;
an optical waveguide formed on the substrate; and
a control electrode for applying an electric field to the optical waveguide, which is directly formed on the substrate,
wherein a thickness of the substrate is 30 μm or less,
wherein the control electrode has a signal electrode and a ground electrode,
wherein a low-permittivity layer is formed by oxidizing the electrodes at least on a surface portion of the signal electrode in contact with the substrate, and
wherein the thickness of the low-permittivity layer is set to be not less than 10 angstroms and not more than 1000 angstroms.

2. The optical waveguide device according to claim 1, wherein the low-permittivity layer is formed by an annealing process.

3. The optical waveguide device according to claim 2, wherein the annealing process is performed on the optical waveguide device, in which the optical waveguide and the control electrode are formed, at a temperature not less than 80° C. and not more than 250° C.

4. A method for fabricating an optical waveguide device, comprising the steps of:
forming an optical waveguide, and a control electrode for applying an electric field to the optical waveguide, on a substrate having an electro-optical effect;
setting a thickness of the substrate to 30 μm or less; and
performing an annealing process on the optical waveguide device at a temperature not less than 80° C. and not more than 250° C. to form a low-permittivity layer on a surface portion of the control electrode in contact with the substrate.

* * * * *